(12) United States Patent
Norton et al.

(10) Patent No.: US 9,695,853 B2
(45) Date of Patent: Jul. 4, 2017

(54) HIGH ENERGY ABSORPTION JOINT

(71) Applicant: Ford Global Technologies, LLC, Dearborn, MI (US)

(72) Inventors: Thomas Norton, Ann Arbor, MI (US); Amanda Kay Freis, Ann Arbor, MI (US); Anthony J. Grima, South Rockwood, MI (US); Garret Sankey Huff, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 14/938,113

(22) Filed: Nov. 11, 2015

(65) Prior Publication Data
US 2017/0130751 A1    May 11, 2017

(51) Int. Cl.
| | | |
|---|---|---|
| *F16B 1/00* | (2006.01) | |
| *F16B 5/02* | (2006.01) | |
| *F16B 25/00* | (2006.01) | |
| *F16B 25/10* | (2006.01) | |
| *B29C 65/48* | (2006.01) | |
| *B29C 65/56* | (2006.01) | |
| *B29L 31/26* | (2006.01) | |

(52) U.S. Cl.
CPC ............ *F16B 5/0241* (2013.01); *B29C 65/48* (2013.01); *B29C 65/56* (2013.01); *F16B 25/0021* (2013.01); *F16B 25/106* (2013.01); *B29L 2031/26* (2013.01)

(58) Field of Classification Search
CPC  F16B 1/00; F16B 5/0241; F16B 11/00; F16B 11/006; F16B 25/0021; F16B 25/106
USPC ................................ 411/82, 82.2, 455; 296/29
See application file for complete search history.

(56) References Cited

U.S. PATENT DOCUMENTS

| | | | | |
|---|---|---|---|---|
| 1,809,758 A | * | 6/1931 | Rosenberg | .......... F16B 25/0021 |
| | | | | 411/413 |
| 3,298,271 A | * | 1/1967 | Krueger | .................... B41L 5/00 |
| | | | | 411/258 |

(Continued)

FOREIGN PATENT DOCUMENTS

| | | |
|---|---|---|
| DE | 102009053979 A1 | 6/2010 |
| DE | 102011114801 A | 5/2012 |

(Continued)

*Primary Examiner* — Roberta Delisle
(74) *Attorney, Agent, or Firm* — Damian Porcari; Brooks Kushman P.C.

(57) ABSTRACT

Joints and methods of forming the same are disclosed. The joint may include a first component including an indentation formed therein having a width, a second component, an adhesive layer disposed between the first and second components, and a fastener extending through the indentation. The fastener may join the first and second components and have a head with a width greater than a minimum width of the indentation. The method may include forming an indentation having a width in a first component, applying an adhesive to one of multiple components, and stacking the components. The indentation may form a bond gap between two components. A fastener may be inserted having a head with a width greater than the width of the indentation into the indentation to join the components. The indentation may space the components apart to provide a larger bond gap for the adhesive.

19 Claims, 5 Drawing Sheets

(56) References Cited

U.S. PATENT DOCUMENTS

| | | | | |
|---|---|---|---|---|
| 3,649,418 | A * | 3/1972 | James | F16B 11/006 |
| | | | | 100/168 |
| 3,655,424 | A * | 4/1972 | Orowan | F16B 5/04 |
| | | | | 29/458 |
| 3,682,508 | A * | 8/1972 | Briles | F16B 4/004 |
| | | | | 403/408.1 |
| 4,834,569 | A * | 5/1989 | Foote | F16B 5/0241 |
| | | | | 403/179 |
| 5,362,120 | A | 11/1994 | Cornille, Jr. | |
| 6,129,326 | A * | 10/2000 | Mandon | B32B 15/04 |
| | | | | 248/632 |
| 6,145,182 | A * | 11/2000 | Mandon | B32B 15/04 |
| | | | | 248/632 |
| 7,819,452 | B2 | 10/2010 | Fuchs et al. | |
| 2010/0183404 | A1* | 7/2010 | Draht | F16B 19/14 |
| | | | | 411/455 |
| 2015/0001892 | A1 | 1/2015 | Saje et al. | |

FOREIGN PATENT DOCUMENTS

| | | |
|---|---|---|
| DE | 102012109517 A1 | 4/2014 |
| DE | 102012222640 A1 | 6/2014 |

* cited by examiner

HIGH ENERGY ABSORPTION JOINT

TECHNICAL FIELD

This disclosure relates to joints capable of high energy absorption, for example, joints including mechanical fasteners and adhesives.

BACKGROUND

Attaching or joining two components is a common process in many industries. For example, in the automotive industry, various components, such as panels, may need to be joined in order to form a vehicle. There are numerous methods for joining two or more components, such as mechanical fasteners, adhesives, or welding/brazing. Each type of joint may have advantages and disadvantages. For example, adhesives are generally good for reducing stress concentrations, but may have low peel performance. Mechanical fasteners/fixings may provide improved peel resistance compared to adhesives, but are discrete.

SUMMARY

In at least one embodiment, a joint is provided including a first component including an indentation formed therein having a width; a second component; an adhesive layer between the first and second components; and a fastener extending through the indentation and joining the first and second components, the fastener having a head with a width greater than a minimum width of the indentation.

In one embodiment, there is a plurality of indentations formed in the first component and/or the second component. In one embodiment, the indentation may include a circular profile. In another embodiment, the indentation is an elongated trench. The first component may be a sheet having a sheet thickness and the indentation may have a thickness that is less than the sheet thickness. At least a portion of the head of the fastener may contact the first component in a region having the sheet thickness. The first and second components may be formed of aluminum or an aluminum alloy. The fastener may be a flow drill screw.

In at least one embodiment, a method of forming a joint is provided. The method may include forming an indentation having a width in a first component; applying an adhesive to the first component or a second component; stacking the first and second components, the indentation forming a bond gap between the first and second components; and inserting a fastener having a head with a width greater than the width of the indentation into the indentation to join the first and second components.

The method may further include forming a plurality of indentations in the first component and/or the second component. In one embodiment, the indentation is formed with a circular profile. In another embodiment, the indentation is formed as an elongated trench having a first side and a second side. The first and second components may be formed of aluminum or an aluminum alloy. The forming step may include forming the indentation with a flat bottom surface and the inserting step may include inserting the fastener into the flat bottom surface. A shaft of the fastener may have a larger diameter than a width of the flat bottom surface. The forming step may include forming the indentation with a side wall and the inserting step may include inserting the fastener into the indentation such that the fastener contacts at least a portion of the side wall during insertion. The side wall may be formed such that a width of the side wall narrows from a top of the indentation to a bottom of the indentation. In one embodiment, the first component is a metal sheet and the indentation is formed during a stamping restrike process. The fastener may be a flow drill screw.

In at least one embodiment, a joint is provided including a first component including an indentation formed therein having a width; a second component; a third component; an adhesive layer disposed between the first and second components; and a fastener extending through the indentation and joining the first, second, and third components, the fastener having a head with a width greater than the width of the indentation.

DETAILED DESCRIPTION

Figure 1:
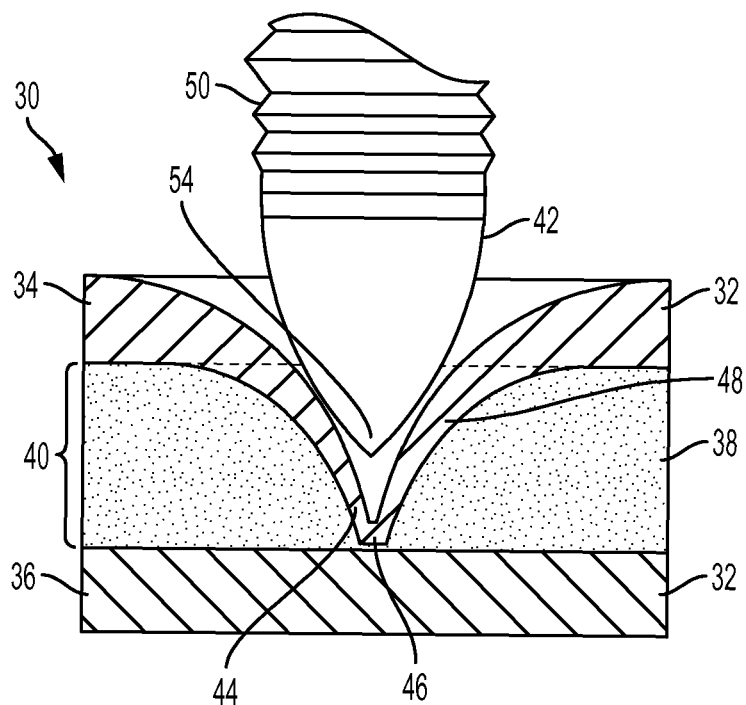
FIG. 1 is a schematic cross-section of a fastener being inserted into a component stack including a component with an indentation, according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described above, adhesives may generally be good for reducing stress concentrations, but may have low peel performance. Highly toughened, flexible adhesives have been developed (e.g., glazing adhesives), that may have high elongation performance. These adhesives may generally gain toughness when the bond-gap is increased (e.g., distance between the adjoining parts). Mechanical fasteners/ fixings may provide improved peel resistance compared to adhesives, but they are discrete, not continuous.

Mechanical fasteners typically require a certain level of clamping pressure to obtain sufficient joint performance. When combining adhesives and mechanical fasteners, this pressure may locally squeeze the adhesive out from underneath a component being joined and create small bond-gaps between the components in the joint. Accordingly, the improved toughness of the adhesive that occurs at larger bond-gaps may not be realized.

There are many types and designs of mechanical fasteners. Any suitable mechanical fastener may be used in the disclosed joint. One type that may be used in the disclosed joint is flow drill screws (FDS). Another type of fastener that may be used is a self-tapping screw. However, any type of single-sided joining method may be incorporated. FDS are an example of single-sided mechanical fasteners that rely on friction to drill through the parent materials, thereby creating the holes and threads required to interlock the material and screw together. This process may require the adjoining parts to be in contact with each other so that sufficient heat can be transferred to all parts. This is achieved by using an axial force exerted by the application tool/gun. In some cases, the back pressure from an adhesive and/or from out of tolerance parts may require high forces to achieve adequate contact.

The disclosed joint configuration and process may reduce or eliminate the need to include a clearance hole in stack-ups of multiple materials, assist in the location of the FDS (or other fasteners, such as alternative self-tapping mechanical fasteners), reduce cycle time and/or fastening pressure, and/or control the bond-gap and increase the adhesive coverage. The joint configuration may provide a joint with increased manufacturing and in-service robustness and increased toughness. The disclosed joint configuration/process may be used in any application where two or more materials are to be joined (e.g., two or more metal components). In one embodiment, the configuration/process may be used to join vehicle components, such as body panels.

Figure 2:
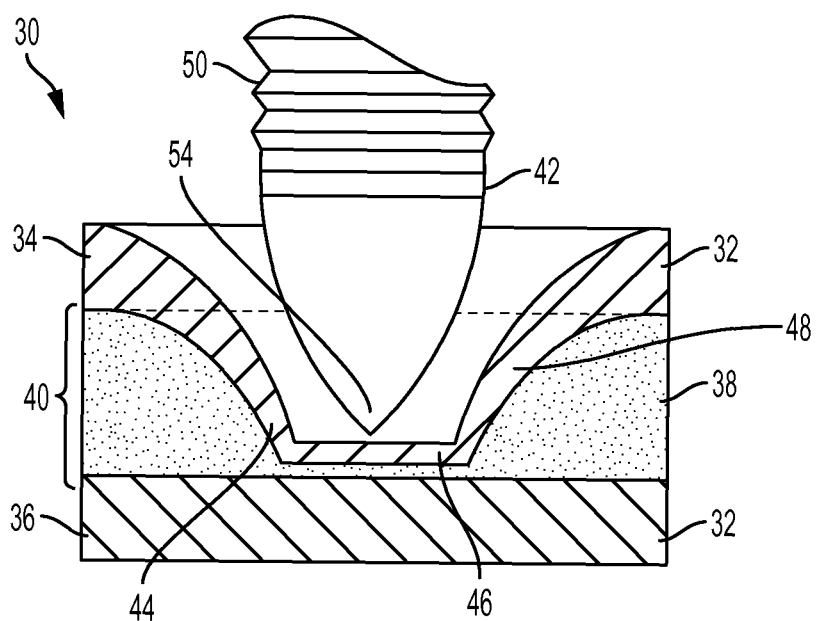
FIG. 2 is a schematic cross-section of a fastener being inserted into a component stack including a component with an indentation, according to another embodiment.
Figure 3:
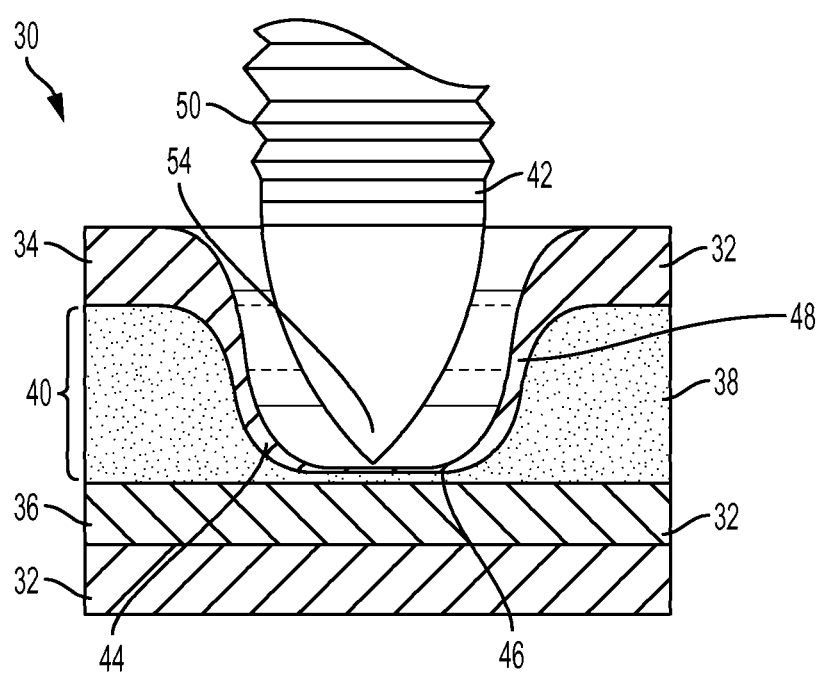
FIG. 3 is a schematic cross-section of a fastener being inserted into a component stack including a component with an indentation, according to another embodiment.

With reference to FIGS. 1-3, several embodiments of a joint system 30 are shown. The joint system 30 may include two or more components 32 to be joined, which may include a first, or top, component 34 and a second, or bottom, component 36. If there are more than two components, such as three, four, or more components 32, then they may be referred to as first, second, third, fourth, etc. The components 32 may be formed of any material that is joinable by a mechanical fastener, such as a FDS. In one embodiment, one or more of the components 32 may be formed of a metal, such as aluminum, steel, iron, or titanium. In another embodiment, one or more of the components 32 may be formed of a polymer, such as a thermoplastic. In another embodiment, one or more of the components 32 may be formed of a composite, for example a fiber composite, such as carbon fiber, glass fiber, SMC, or others. The components 32 may be a mix of any of the above materials. In one embodiment, both (or all) of the components 32 may be formed of aluminum or an aluminum alloy.

At least two of the components 32 may be joined by an adhesive 38, which may for a layer between the components. The adhesive 38 may be any adhesive having high elongation performance and that has improved toughness (e.g., energy absorption) as the bond-gap is increased. The distance between the two components 32 in the final joint may be referred to as the bond gap 40, which may also correspond to the thickness of the adhesive 38. This bond gap 40 may refer to the distance between the components 32 in the bulk or majority of the area between the components 32. There may be local areas of reduced bond gap, for example, at areas where a fastener has pulled the two components together or otherwise connects the two components. Accordingly, the bond gap 40 may refer to the distance between the components 32 in the area between or not including fasteners. An average bond gap may describe the bond gap including areas with reduced spacing, but may closely approximate the bond gap between fasteners due to the relatively low area of fasteners compared to unfastened area in the components 32. In one embodiment, the average bond gap may be at least 0.05 mm. In another embodiment, the average bond gap may be at least 0.1 mm or at least 0.2 mm.

The joint 30 may also be joined by a mechanical fastener 42, such as a flow drill screw (FDS) or self-tapping screw. As described above, mechanical fasteners generally require a certain level of clamping or downward pressure to obtain sufficient joint performance. When combining adhesives and mechanical fasteners, this pressure may locally squeeze the adhesive out from underneath a component being joined and create small bond-gaps between the components in the joint. Accordingly, the improved toughness of the adhesive that occurs at larger bond-gaps may not be realized. In order to maintain or create a larger bond gap 40, one or both/all of the components 32 may be provided with a dent, depression, or indentation 44 that prevents or resists the components 32 from coming closer together or contacting when the fastener 42 is inserted.

With reference to FIG. 1-3, several examples of indentations 44 are shown with different shapes and configurations. In the examples shown, the top component 34 has an indentation 44 and the bottom component 36 does not. However, as described above, the configuration could be switched (top does not, bottom does), or both components may have an indentation 44 (in mating/contacting or non-mating/contacting positions). While a single indentation is shown, the component(s) may have a plurality of indentations 44 formed therein, which may be spaced apart or located at certain intervals. In one embodiment, there may be an indentation 44 corresponding to each fastener 42. In another embodiment, each fastener 42 may have a corresponding indentation 44 (multiple fasteners 42 may have a common indentation 44). Moreover, there may be additional components 32, which may be stacked above, below, or between the components shown. These components 32 may or may not include indentations 44. In one embodiment, one, two, or more additional components 32 may be stacked under or below the bottom component 36 shown. If there are additional components 32, they may have layers of adhesive between them or they may be in contact with each other and/or the bottom component 36.

The indentation 44 may be formed in any suitable manner. For example, if the component 32 is a metal component, the indentation 44 may be formed by a stamping operation with a suitable die. In one embodiment, the indentation 44 may be formed during a restrike operation using a restrike tool. This may ensure that the indentation 44 is formed after the majority or all of the other forming processes have occurred so that the shape and location of the indentation 44 does not change significantly before a fastener 42 is inserted therein. The indentations 44 may also be formed using other methods, such as punching, cutting, or other machining or material removal processes. The indentations 44 may also be cast into a component. If the component is a polymer, the indentations 44 may be formed during an injection molding process. The formation of the indentations 44 may thin the material of the indentation 44. For example, if the indentation 44 is formed during a stamping or restrike operation, the material may be drawn and thinned during the process.

The indentation 44 may have a bottom surface 46 and a side wall 48. The bottom surface 46 may be flat, or substantially flat, relative to the component surface (e.g., areas without an indentation). The bottom surface 46 may be parallel, or substantially parallel, to another component in the stack. For example, in the indentations shown in FIGS. 1-3, the bottom surface 46 in the indentation 44 in top component 34 is parallel to bottom component 36.

The bottom surface 46 may have a thickness that is reduced compared to the bulk of the component (e.g., top component 34, as shown). This reduced thickness may facilitate easier and/or faster insertion of the fastener 42. If a FDS is used as the fastener, a thinner bottom surface 46 may heat and locally melt faster compared to the thicker bulk of the component. This may allow reduced axial force to be used and/or reduce the cycle time to insert the FDS. The side wall 48 may also have a thickness that is reduced compared to the bulk of the component, however, it may be reduced to a lesser extent than the bottom surface 46. However, the side wall 48 and/or bottom surface 46 may also have the same thickness as the bulk of the component.

The bottom surface 46 may have a width or diameter that is configured to be the same or smaller than a diameter of the shaft 50 of the fastener 42. For example, if a FDS has a 3 mm shaft diameter, the bottom surface 46 may have a width/diameter of less than 3 mm, such as from 0.5 to 2.5 mm. Accordingly when a fastener 42 is inserted into the indentation 44 and through the bottom surface 46, the shaft 50 may completely remove or replace the bottom surface 46. As a result, there may not be a thinned region bottom region of the component including the indentation 44 in the completed joint. In addition, a head 52 of the fastener 42 may have a diameter that is wider or larger than a width or diameter of the bottom surface 46 of the indentation 44.

In one embodiment, the head 52 of the fastener 42 may have a diameter that is wider or larger than a dimension of the indentation 44 itself, such as a minimum dimension. The dimension may be perpendicular to a height or depth of the indentation 44, such as a diameter or width of the indentation (e.g., a minimum diameter or width). Alternatively, it may be any dimension parallel to the head diameter. The minimum dimension may be determined at the top of the indentation (e.g., directly adjacent to the head 52, once inserted). Accordingly when a fastener 42 is inserted into the indentation 44 and through the bottom surface 46, the head 52 of the fastener may contact at least a portion of the component that is not part of the indentation 44. This may allow the fastener 42 to be in contact with the relatively thick bulk portion of the component, providing a stronger joint than if the head 52 contacted the bottom surface 46 or side wall 48.

The side wall 48 of the indentation 44 may be continuous, although it appears to have a left and right side in cross-section. The side wall 48 may taper or narrow in width from its top towards the bottom surface 46. The side wall 48 may be concave or convex relative to the bulk of the component in which the indentation 44 is made. For example, in FIGS. 1 and 2, the side wall 48 has a convex curvature. In FIG. 3, the side wall 48 generally has a concave curvature, although the top of the wall has a convex curvature. FIG. 3 also includes an additional component 32 located under the first and second components 34 and 36. The side wall 48 may also have a constant, or substantially constant, incline. For example, the side wall 48 may slope downward toward the bottom surface at an angle of 30°, 45°, 60°, or another angle.

In some embodiments, the side wall 48 may vary along a circumference or perimeter of the indentation 44. For example, in cross-section, such as in FIGS. 1-3, the left portion of the side wall 48 may have a 30° angle and the right side may have a 60° angle. Of course the two portion may have any combination of the configurations described above (e.g., concave, convex, constant incline) or others. In addition, there may be more than two portions of the side wall 48 having different configurations.

The side wall 48 may be configured such that the tip 54 and/or shaft 50 of the fastener 42 contacts at least a portion of the side wall 48 when inserted. For example, a distance between opposing sides for the side wall 48 may be less than a diameter of the shaft 50 or at least a portion of the tip 54 of the fastener along at least a portion of the height of the indentation 44. Therefore, contact between the fastener 42 and the side wall 48 may be ensured during insertion. The side wall 48 may be configured such that the tip 54 and/or shaft 50 only contact a portion of the side wall 48 or such that it contacts all, or substantially all, of the side wall 48. For example, as shown in FIGS. 1-3, the side wall 48 may be configured such that the tip 54 and/or shaft 50 of the fastener 42 does not contact an entire height of the side wall 48 when inserted. In another embodiment, the fastener 42 may be inserted such that the tip 54 and/or shaft 50 do not contact a portion of the side wall 48 along its entire height or a majority of its height.

It has been discovered that by configuring the indentation 44 such that there is contact between the side wall 48 and the fastener 42 (e.g., the tip 54) during insertion of the fastener, the contact between the FDS and the side wall 48 may increase the friction generated, which creates more heat. This increased heat may cause the material in the components being joined to heat and form quicker, reducing the cycle time necessary to insert the FDS for a given axial force. Alternatively, the axial force may be reduced and the cycle time may be reduced to a lesser extent or remain the same. Accordingly, by increasing the friction between the fastener and the component, the fasteners may be inserted faster and/or with less effort. This may lower assembly times significantly due to the aggregation of time savings for each fastener.

Figure 4:
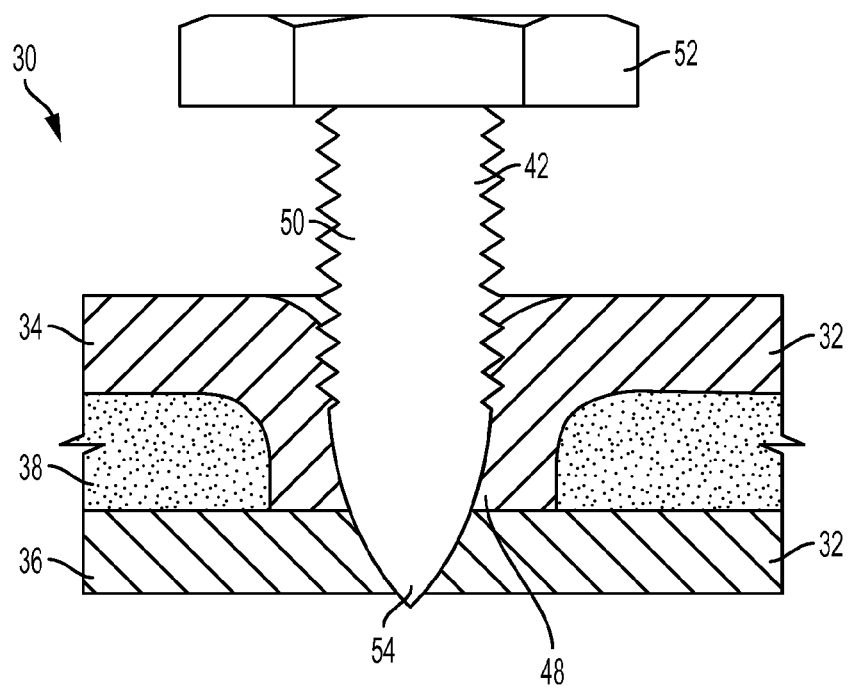
FIG. 4 is a schematic cross-section of a fastener partially inserted into a component stack including a component with an indentation, according to an embodiment.
Figure 5:
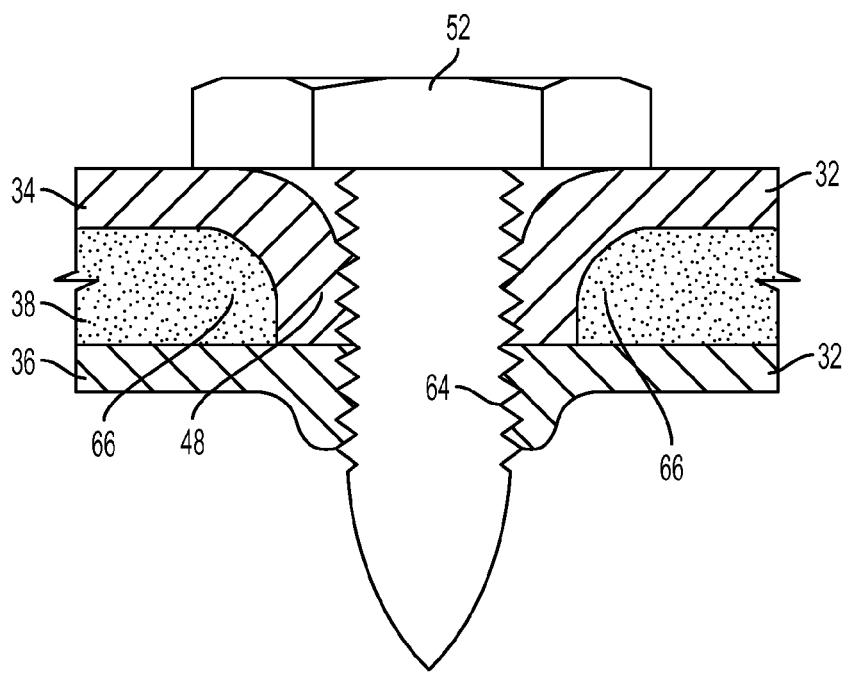
FIG. 5 is a schematic cross-section of a fastener fully inserted into a component stack including a component with an indentation, according to an embodiment.
Figure 6:
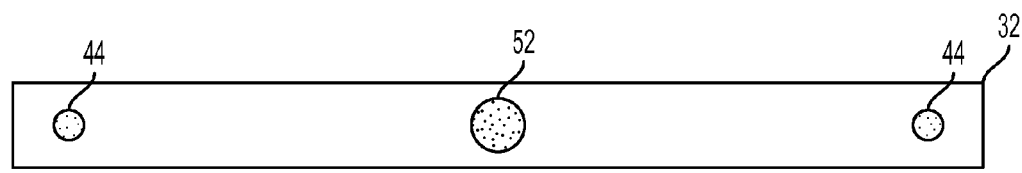
FIG. 6 is a top plan view of a fastener inserted into a component stack including a component with a circular indentation, according to an embodiment.

With reference to FIGS. 4 and 5, the joint system 30 is shown with the fastener 42 entering (FIG. 4) and fully inserted (FIG. 5) into the stack of components 32. As shown in FIG. 4, the shaft 50 of the fastener 42 may contact the side wall 48 of the indentation 44 during insertion. The tip 54 of the fastener 42 may penetrate through the components 32 and the adhesive 38. As shown in FIG. 5, when the threaded portion of the shaft 50 comes in contact with the side wall 48 and/or the bottom component 36 it may form threads 64 in the side wall 48 and/or the bottom component 36. As described in additional detail below, the head 52 of the fastener may extend over, overly, or overhang at least a portion 66 of the adhesive layer 38 that remains at or near full thickness (e.g., the height of the indentation or the bond gap).

The indentation 44 may have any suitable shape (e.g., in top plan view). With reference to FIGS. 6-9, some examples of indentation shapes are shown. In one embodiment, shown in FIG. 6, the indentations 44 may have a circular shape in top plan view (and in cross-sections parallel to the component top and bottom surfaces). In this embodiment, the diameter of the indentations 44 (e.g., at its top/widest) may be less than the head 52 of the fastener 42 to be inserted. Therefore, when the fastener is inserted, the head 52 contacts the component in an annular region of full-thickness material (e.g., not part of the indentation). This may improve the strength of the joint by securing the components together in regions where the top component is at full thickness instead of reduced thickness.

Figure 7:
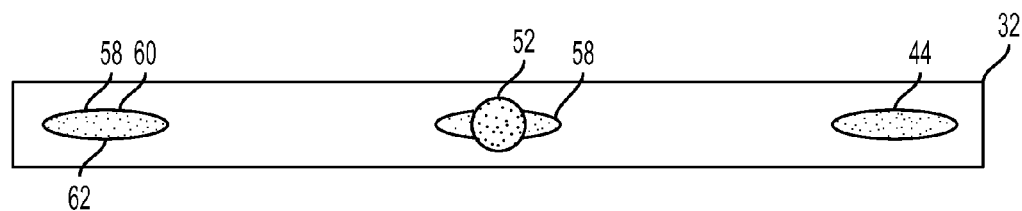
FIG. 7 is a top plan view of a fastener inserted into a component stack including a component with an elongated indentation, according to an embodiment.
Figure 8:
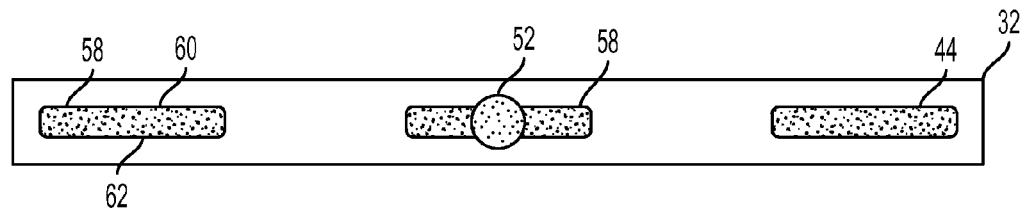
FIG. 8 is a top plan view of a fastener inserted into a component stack including a component with an elongated indentation, according to another embodiment.
Figure 9:
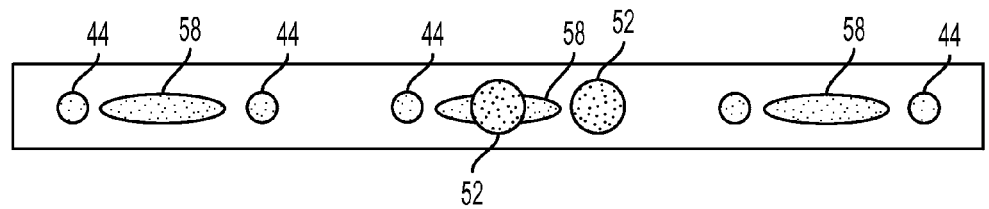
FIG. 9 is a top plan view of a fastener inserted into a component stack including a component with circular and elongated indentations, according to an embodiment.

In other embodiments, shown in FIGS. 7-8, the indentations 44 may have an elongated shape in top plan view (and in cross-sections parallel to the component top and bottom surfaces). These indentations 44 may be referred to as trenches 58 and may have first and second opposing elongated sides 60 and 62. The shape of the elongated trenches 58 may be any suitable shape having a major axis and a minor axis. For example, the trenches 58 may have an oval or elliptical shape, such as shown in FIG. 7. In another example, the trenches 58 may have a rectangular or rounded rectangular shape, such as shown in FIG. 8. The minor axis, or width (e.g., at its top/widest), of the trenches 58 may be less than the diameter of the head 52 of the fastener 42 to be inserted. Therefore, when the fastener is inserted, the head 52 contacts at least a portion of the component where the component is at full thickness (e.g., not part of the indentation). This may improve the strength of the joint by securing the components together in regions where the top component is at full thickness instead of reduced thickness.

The shape of the indentations 44 may vary from component to component or within components. For example, in the component shown in FIG. 9, there are circular indentations and oval/ellipse indentations. The shape of the indentation 44 may be chosen based on the desired improvement in fastener insertion. For example, circular (or non-elongated) indentations may provide the most contact between the fastener tip/shaft and the indentation. This may provide higher friction, thereby generating more heat and allowing the fastener to penetrate the component more quickly and with less force. Circular (or non-elongated) indentations may therefore be used when reducing force or cycle time are high priorities. Elongated or trench indentations may still provide contact between the fastener tip/shaft and the indentation, but it may be less than circle indentations due to the side wall not contacting the fastener on all sides. Elongated indentations may provide more resistance to bond-gap closure, however, by increasing the size/length of the stand-off between the two components. Accordingly, the clamping or tightening force of the fastener may not cause closure or reduction of the bond-gap for elongated indentations (or to a lesser degree than for circular).

The sides 60 and 62 of the trenches 58 may be identical or they may be different. For example, the first side 60 may have a concave side wall and the second side 62 may have a convex side wall (or vice versa). Similarly, if the side walls have a substantially constant angle, the angles of the sides 60 and 62 may be different. For example, the first side 60 may have a relatively steep angle of 60° to 85° and the second side 62 may have a relatively shallow angle of 20° to 50° (or vice versa). The sides may also have the same angle, which may be either of the above ranges. In one embodiment, the trenches may be configured such that the tip/shaft of the fastener contacts both sides of the trench when inserted. In another embodiment, the trenches may be configured such that the tip/shaft of the fastener contacts one of the sides of the trench when inserted, but not the other. The trenches may also be configured such that the tip/shaft of the fastener contacts one of the sides of the trench to a greater extent (e.g., higher area of contact) than the other when inserted. The configuration of the sides of the trenches may be adjusted to provide more or less contact between the indentation and the fastener, in order to increase or decrease the friction and heat generated during insertion. In some instances, if there is too much contact (and therefore friction/heat), the fastener (e.g., FDS) may heat and insert too rapidly for the threads to adequately form. Accordingly, the trench walls may be configured to provide a contact area that results in a desired amount of friction so that the fastener can be inserted quickly but will still form threads in the component.

The indentations 44, in addition to improving cycle time or reducing axial force, may also assist in fastener location and/or increase the tolerances for fastener insertion. The indentation 44 may act as a target or identifier for a locating/sensing system, such as an optical recognition system. In addition, elongated indentations (e.g., trenches) may also assist in fastener location by allowing larger tolerances in the placement of fasteners. For example, if a robot is configured to insert a fastener in the center of the long axis of a trench, the robot placement may be off by about half the trench length in either direction and still make an acceptable insertion. In some fastenings systems, it may be difficult to accurately control or locate the fastener on one axis. For example, if the x-axis is well controlled or more accurate, the trench may be oriented with its long axis on the y-axis of the system. Therefore, the system can accurately find the narrower, minor axis of the trench on the x-axis and there will be increased flexibility or forgiveness in the y-axis when finding the fastener location and inserting a fastener in trench. The same may apply if the y-axis is well controlled (e.g., orient trench on the x-axis). In one embodiment, the trench length may be determined at least in part based on the tolerances of the equipment used to locate the fasteners. For example, the trench length may be the sum of the fastener shaft diameter, the tolerances of the shaft diameter, and the tolerances of the locating equipment. Accordingly, if the shaft diameter is 5 mm, the shaft tolerance is ±1 mm, and the tolerance of the locating equipment is ±6 mm, then the trench may have a length of about 19 mm (5+2+12).

The indentation width may be at least partially determined by the width of the fastener shaft and/or the thickness of the component. In one embodiment, the indentation width may be the same or about the same (e.g., ±1 mm) as the shaft diameter of the fastener. Therefore, when the fastener is inserted, it may occupy or substantially occupy the entire width of the indentation. As described above, this may ensure that the head (wider than the shaft) of the fastener is contacting at least a portion of the component that remains at full thickness (e.g., the thickness of the component prior to indentation). In addition to contacting at least a portion of the component that remains at full thickness, the head may overly or overhang at least a portion of the adhesive layer that remains at or near full thickness (e.g., the size of the bond gap or the height of the indentation). For example, the head may overly or overhang at least a portion of the adhesive layer that has a thickness of at least 50% of the bond gap or indentation thickness, such as at least 60%, 75%, 85%, or at least 90% of the bond gap or indentation thickness. This is shown in FIGS. 4-9, where the head 52 of the fastener either completely covers and extends beyond the indentation (e.g., circular indentations in FIGS. 6 and 9) or extends past the sides 60 and 62 of elongated indentations (e.g., trenches in FIGS. 7-9). Each component to be joined may include one or a plurality of indentations 44. If there are a plurality of indentations, they may be spaced apart.

Figure 10:
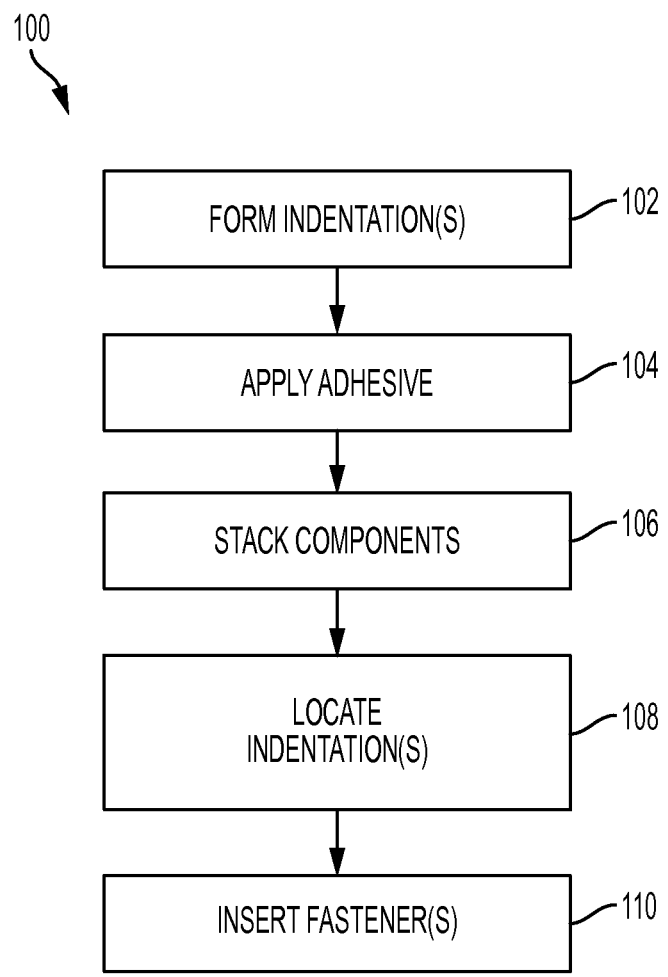
FIG. 10 is an example of a flowchart for a method of joining a component with an indentation to one or more additional components.

With reference to FIG. 10, a flowchart 100 is shown for a method of joining two or more components according to the disclosed joint configurations. In step 102, one or more indentations may be formed in one or more components to be joined. The method will be described for two metal components being joined, however, other materials, shapes, and stack sizes are also possible, as described above. The indentations may be made using any suitable method, such as stamping or restriking. In step 104, an adhesive may be applied to one or both of the components to be joined (if both, then on the surfaces to be joined). The adhesive may be a high energy/toughness adhesive that increases in toughness with thickness (e.g., larger bond gap). The adhesive may be applied with a certain thickness, which may be the desired final thickness.

In step 106, the components may be stacked with the indentations being inserted into the adhesive layer. The indentations may therefore create and maintain a bond gap between the components to be joined by contacting the other component and spacing them apart between indentations. This bond gap may be the same as the as-applied adhesive layer thickness, or it may be smaller. While step 106 is shown after step 104, the order may be reversed such that the components are stacked (thereby creating the bond gap) and adhesive is inserted between the components. The order may depend on the viscosity of the adhesive, the size of the metals components, or other factors.

In step 108, the indentations may be located by the fastening equipment, if the process is automated (e.g., using robots or detections systems). As described above, the indentations may serve as locating points, making it easier for the fastening equipment to find the desired location for fastener insertion. The indentations may also allow for looser or more relaxed tolerances in one direction, as described previously. The location of the indentations may be identified using any suitable method known in the art, such as optical recognition. Alternatively, the locations may be programmed into the equipment, such as robots.

In step 110, a fastener may be inserted into the indentation. One fastener may be inserted into each indentation, or multiple fasteners may be inserted into an indentation. The fasteners may be self-tapping screws or flow drill screws (FDS), in which case insertion may generally include placing the screw, rotation/heating, melting/forming, forming thread, and insertion/tightening. The fasteners may be placed such that they contact and enter the bottom surface of the indentation, which may be flat. As described above, the fastener may completely replace the bottom surface when inserted. The fastener may be inserted such that a portion or all of the side wall of the indentation is contacted by the tip/shaft of the fastener during insertion. If greater friction is desired, then the indentation may be configured to have higher contact area with the fastener, and vice versa. During insertion, the indentations may prevent or reduce adhesive being squeezed out from between the components, thereby maintaining a large bond gap.

As described above, the method may be used to join two or more components. While joints between two or three components have been shown and described, one or more additional components may be added to the stack (e.g., below the bottom component). Each additional component may be flat in the region of the joint or may include indentations to create a bond gap between it and another component, similar to above. The method may be used to join vehicle components, which may include panels or sheets. The components may be formed of metal, such as aluminum (e.g., pure or alloy) or steel. For example, both components may be aluminum.

The disclosed joint configurations and methods including components having indentation formed therein may improve the strength and/or toughness (e.g., energy absorption) of the joints between components. As described above, joining using conventional fasteners leads to the bond gap being squeezed together and almost eliminated. Since the amount of energy absorbed by high elongation adhesives may be proportional to their thickness, a several-fold increase in bond gap thickness may result in hundreds of percent increase in toughness of the joint. In one embodiment, the bond gap formed by the disclose indentations may be at least 100% greater than a bond gap under the same conditions without indentations (e.g., same adhesive, same fasteners, etc.). In another embodiment, the bond gap may be at least 200%, 300%, 400%, or more greater than a bond gap under the same conditions without indentations. Since the toughness of the joint may be proportional to the adhesive thickness, the energy absorption of the disclosed joints may be greater than joints without indentations by the same amounts.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A joint comprising:
    a first component including an indentation formed therein having a width and a flat bottom surface;
    a second component;
    an adhesive layer between the first and second components; and
    a fastener extending through the flat bottom surface of the indentation and joining the first and second components, the fastener having a head with a width greater than a minimum width of the indentation.

2. The joint of claim 1, wherein there are a plurality of indentations formed in the first component and/or the second component.

3. The joint of claim 1, wherein the indentation includes a circular profile.

4. The joint of claim 1, wherein the indentation is an elongated trench.

5. The joint of claim 1, wherein the first component is a sheet having a sheet thickness and the indentation has a thickness that is less than the sheet thickness.

6. The joint of claim 5, wherein at least a portion of the head of the fastener contacts the first component in a region having the sheet thickness.

7. The joint of claim 1, wherein the first and second components are formed of aluminum or an aluminum alloy.

8. The joint of claim 1, wherein the fastener is a flow drill screw.

9. A method of forming a joint, comprising:
    forming an indentation having a width and a flat bottom surface in a first component;
    applying an adhesive to the first component or a second component;
    stacking the first and second components, the indentation forming a bond gap between the first and second components; and
    inserting a fastener having a head with a width greater than the width of the indentation into the flat bottom surface of the indentation to join the first and second components.

10. The method of claim 9, further comprising forming a plurality of indentations in the first component.

11. The method of claim 9, wherein the indentation is formed with a circular profile.

12. The method of claim 9, wherein the indentation is formed as an elongated trench having a first side and a second side.

13. The method of claim 9, wherein the first and second components are formed of aluminum or an aluminum alloy.

14. The method of claim 9, wherein a shaft of the fastener has a larger diameter than a width of the flat bottom surface.

15. The method of claim 9, wherein the forming step includes forming the indentation with a side wall and the inserting step includes inserting the fastener into the indentation such that the fastener contacts at least a portion of the side wall during insertion.

16. The method of claim 15, wherein the side wall is formed such that a width of the side wall narrows from a top of the indentation to a bottom of the indentation.

17. The method of claim 9, wherein the fastener is a flow drill screw.

18. The method of claim 9, wherein the first component is a metal sheet and the indentation is formed during a stamping restrike process.

19. A joint comprising:
a first component including an indentation formed therein having a width and a flat bottom surface;
a second component;
a third component;
an adhesive layer disposed between the first and second components; and
a fastener extending through the flat bottom surface of the indentation and joining the first, second, and third components, the fastener having a head with a width greater than the width of the indentation.

\* \* \* \* \*